(12) United States Patent
Mitchell

(10) Patent No.: US 7,266,131 B2
(45) Date of Patent: Sep. 4, 2007

(54) DATA PACKET DECODING

(75) Inventor: Kevin Mitchell, Edinburgh (GB)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 11/486,915

(22) Filed: Jul. 14, 2006

(65) Prior Publication Data

US 2007/0013563 A1    Jan. 18, 2007

(30) Foreign Application Priority Data

Jul. 18, 2005    (GB) ................................ 0514646.9

(51) Int. Cl.
*H04J 3/16* (2006.01)
(52) U.S. Cl. ..................... 370/469; 370/466; 370/467
(58) Field of Classification Search ................ 370/252, 370/352, 354, 469, 474, 476; 341/50, 51; 709/224, 230, 228, 246
See application file for complete search history.

(56) References Cited

U.S. PATENT DOCUMENTS

| | | | | |
|---|---|---|---|---|
| 5,189,663 A * | 2/1993 | Williams | ..................... | 370/251 |
| 5,418,972 A * | 5/1995 | Takeuchi et al. | ............ | 709/230 |
| 6,278,706 B1 * | 8/2001 | Gibbs et al. | ................ | 370/352 |
| 6,535,522 B1 * | 3/2003 | Arato et al. | ................ | 370/466 |
| 6,665,725 B1 * | 12/2003 | Dietz et al. | .................. | 709/230 |
| 6,963,586 B2 * | 11/2005 | Henriksson et al. | ........ | 370/469 |
| 7,240,000 B2 * | 7/2007 | Harada | ....................... | 704/212 |
| 2002/0103937 A1 | 8/2002 | Tillmann et al. | | |
| 2003/0177258 A1 * | 9/2003 | Kulkarni et al. | ............ | 709/236 |
| 2004/0010612 A1 * | 1/2004 | Pandya | ...................... | 709/230 |
| 2004/0034703 A1 | 2/2004 | Phadke | | |
| 2004/0122983 A1 * | 6/2004 | Speed et al. | .................... | 710/1 |
| 2005/0210157 A1 * | 9/2005 | Sakoda | ....................... | 709/251 |

OTHER PUBLICATIONS

GB Search Report dated Sep. 12, 2005.

* cited by examiner

*Primary Examiner*—Linh Nguyen

(57) ABSTRACT

Apparatus and method for generating decoding instructions for a decoder for decoding data packets from a telecommunications network, each of the data packets having a plurality of fields formatted in a predetermined protocol defined by a protocol specification. The apparatus comprises an input, an instruction generator and an output, the instruction generator receiving an enhanced protocol specification having the protocol specification and application operations attached thereto. The instruction generator analyzes the enhanced protocol specification to determine which fields in a data packet formatted in the corresponding protocol are required in order to enable the application operations to be executed and generates instructions for controlling the decoder to decode the required fields and to execute the particular application instruction.

10 Claims, 3 Drawing Sheets

DATA PACKET DECODING

This invention relates to decoding data packets in a telecommunications network, specifically, though not exclusively, for generating decoding instructions to be used for the decoding of data packets from a telecommunications network.

BACKGROUND ART

Many telecommunication management applications need to decode data packets efficiently. For example, many modern switched telecommunications systems (in particular, modern Public Switched Telephone Networks (PSTNs) and Public Land Mobile Networks (PLMNs)) are formed by two related but separate network infrastructures: a bearer or transmission network for carrying end-user voice and data traffic, and a signalling network for controlling the setup and release of bearer channels through the bearer network in accordance with control signals transferred through the signalling network (sometimes known as out-of-band signalling). Such signalling traffic needs to be monitored for billing and fraud detection purposes. In some cases, a system monitoring for "denial of service" attacks may need to perform a packet inspection to detect the signature of an attack. In other cases, an Operation Support System (OSS) monitoring Service Level Agreements (SLAs) needs to distinguish between different packet flows. A network analyzer probing for erroneous behaviour may need to examine, in detail, selected packets. An OSPF (Open-Shortest-Path-First) based topology discovery component may need to examine specific routing information within packets.

The packets flowing through the network may be formatted according to a number of different protocols. Each packet is formed of a sequence of bits, the sequence being divided into fields. In some protocols the fields may be further divided in a hierarchical fashion into sub-fields. In this regard, although the term "field" will be used hereinafter, it will be appreciated that it is intended to include "subfields" within this term. In order to monitor the packets, the packets must be decoded, at least to ascertain their hierarchical structure, with the decoding being dependent on the particular protocol in which the packet has been formatted. Each protocol is defined by a protocol specification, which is, of course, known. Thus, in order to decode packets on the network, a decoder is provided that decodes packets formatted in one or more particular protocols of interest, the decoding operation being specified based on the protocol specifications of the protocols of interest. Of course, if all the possible protocol specifications are known, a single (very complicated) decoder may be provided to decode all the packets. Usually, however, decoders are provided just for particular protocols of interest. In order to implement the decoder, the operations necessary for the decoding are derived from the protocol specification. These operations can be compiled manually, or by using a specialized protocol compiler for those cases where the protocol is specified formally. It will be apparent that if tens, or even hundreds, of different protocol specifications have to be supported, it can be quite complicated to produce the decoder.

In general, after the decoder has decoded the packets, the decoded data from the packets is provided to an application processor to carry out data processing on the data. It will be appreciated, however, that if, for example, the application processor only needs to carry out processing on a small proportion of the data, i.e. the data from only a few fields from only packets of a particular protocol, then decoding of the whole of all of the packets prior to the application processing is highly inefficient. In some limited cases, it has been known to "transfer" some of the application processing to the decoder so that the appropriate processing might be carried out on particular fields as soon as they have been decoded, but even with this technique the whole of each of the packets is still decoded at some point.

The post-processing approach, where operations are executed after the entire packet has been decoded, is often inefficient. A packet decoder might only require access to a small number of fields within the packet, and the work required to decode the other fields can be viewed as wasted effort. Furthermore, the packet decoder may often perform additional checks on the packet to assess its suitability for further processing. It is preferable to execute such code as early as possible to allow the packet decoder to reject packets that are of no interest. Unfortunately the post-processing approach is typically all that is available when some protocol compilers are used, for example a traditional ASN.1 compiler. This inefficiency can be offset to some extent using filtering, i.e. performing a pre-processing pass to "weed out" at least some of the packets for which there is no interest. Nevertheless, for a complex protocol a lot more work may still need to be performed than is really necessary.

Therefore, what is required is an efficient method of enabling a packet decoder to decode packets at high speed, but that also uses a protocol specification-driven approach to the development of the packet decoder. More specifically, it would be desirable for the packet decoder to determine which fields are required, directly or indirectly, by the user application.

SUMMARY OF THE DISCLOSED EMBODIMENTS

According to one aspect of this invention there is provided an apparatus for generating decoding instructions for a decoder for decoding data packets from a telecommunications network, each of the data packets having a plurality of fields formatted in a predetermined protocol defined by a protocol specification, the apparatus comprising an input, an instruction generator and an output, the instruction generator receiving an enhanced protocol specification having the protocol specification and application operations attached thereto, wherein the instruction generator analyzes the enhanced protocol specification to determine which fields in a data packet formatted in the corresponding protocol are required in order to enable the application operations to be executed and generates instructions for controlling the decoder to decode the required fields and to execute the application operations.

According to one embodiment, the required fields include a first type of field that are specified by the application operations and a second type of field that are needed in order to provide information about the first type of field and the instruction generator generates instructions for controlling the decoder to decode the first type and the second type of fields.

The instruction generator may generate instructions for controlling the decoder to decode only the required fields. The instruction generator may interleave the instructions for controlling the decoder to decode required fields and the instructions for controlling the decoder to execute application operations.

According to a second aspect, the invention provides a decoding system for decoding data packets from a telecommunications network, each of the data packets having a plurality of fields formatted in a predetermined protocol defined by a protocol specification, the decoding system comprising a decoder and an apparatus according to any preceding claim, the decoder comprising a first input for receiving the decoding instructions, directly or indirectly, from the apparatus, a second input for receiving data packets from the telecommunications network, a decoding module and an output, the decoding module decoding the data packets from the second input according to the decoding instructions received at the first input and providing data from the decoded data packets at the output.

The decoding system may further comprise a compiler having an input coupled to the output of the apparatus and an output coupled to the input of the decoder for compiling the decoding instructions from the apparatus into a format suitable for the decoder.

According to a third aspect, the invention provides a method of generating decoding instructions for a decoder for decoding data packets from a telecommunications network, each of the data packets having a plurality of fields formatted in a predetermined protocol defined by a protocol specification, the method comprising: receiving an enhanced protocol specification having the protocol specification and application operations attached thereto, analyzing the enhanced protocol specification to determine which fields in a data packet formatted in the corresponding protocol are required in order to enable the application operations to be executed, and generating instructions for controlling the decoder to decode the required fields and to execute the application operations.

In one embodiment, the required fields include a first type of field that are specified by the application operations and a second type of field that are needed in order to provide information about the first type of field and the instruction generator generates instructions for controlling the decoder to decode the first type and the second type of fields.

Generating instructions may comprise generating instructions for controlling the decoder to decode only the required fields. Generating instructions may comprise interleaving the instructions for controlling the decoder to decode required fields and the instructions for controlling the decoder to execute application operations.

BRIEF DESCRIPTION OF DRAWINGS

A method and apparatus in accordance with one embodiment of this invention, for generating decoding instructions to be used for the decoding of data packets from a telecommunications network, will now be described, by way of example, with reference to the accompanying drawings, in which.

DETAILED DESCRIPTION

Figure 1:
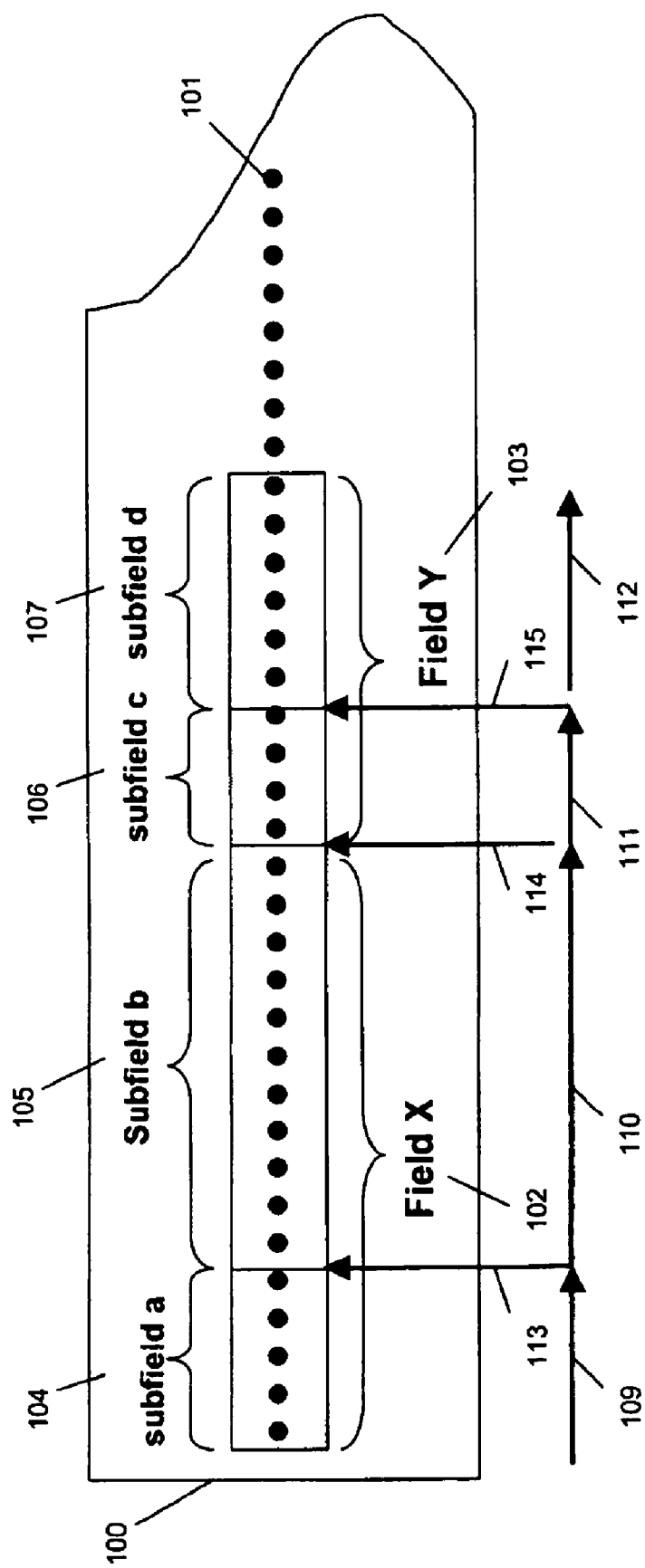
FIG. 1 is a diagram showing an example of the structure of a data packet.

Thus, FIG. 1 is a diagram showing an example packet structure as known in the art. There is shown a packet 100, formed of a bit sequence 101, divided into several fields, e.g. Field X 102, and Field Y 103, where one or more of the fields may be subdivided into subfields. In this case, Field X 102 is shown as subdivided into subfield a 104 and subfield b 105, and Field Y 103 is shown as subdivided into subfield c 106 and subfield d 107. Field lengths 109, 110, 111, 112 as well as bit offsets 113, 114, and 115 are also shown.

In general, a field 102 or 103 or a subfield 104 to 107, might start on an arbitrary bit alignment boundary, and have a length consisting of an arbitrary, and variable, number of bits. Therefore, in general, a field 102, 103 has to be represented by a starting address, a bit offset into the byte starting at this address, and the total number of bits. Although some or all of this information may be predetermined and defined in the protocol specification, in some cases, some of the information, such as the bit offset and the field (or subfield) length, may be provided as information encoded within a previous field or subfield, again as may be defined in the protocol specification.

As mentioned above, the purpose of decoding the data packets is to enable data processing applications to process the data from the data packets to analyse the operation of the telecommunication network to help optimise various aspects of its management. In some cases, the particular data that is actually required from the data packets may be a relatively small part of the overall data packet, so that decoding the entire data packet prior to carrying out the data processing would be rather inefficient. Accordingly, the protocol specification is enhanced by the addition of one or more operations which are taken from the data processing application that would, conventionally, have been provided after the decoding operation. Thus, in the example mentioned above, if only the UDP destination ports that were in use on a link in a network are needed to be monitored, for example, to calculate their frequency of use, then the protocol specification can be enhanced by the addition of an operation that would instruct the decoder to carry out the frequency summing operation. These operations contain metavariables that refer to fields, which would need to be previously decoded in order to allow the operation to proceed.

Figure 2:
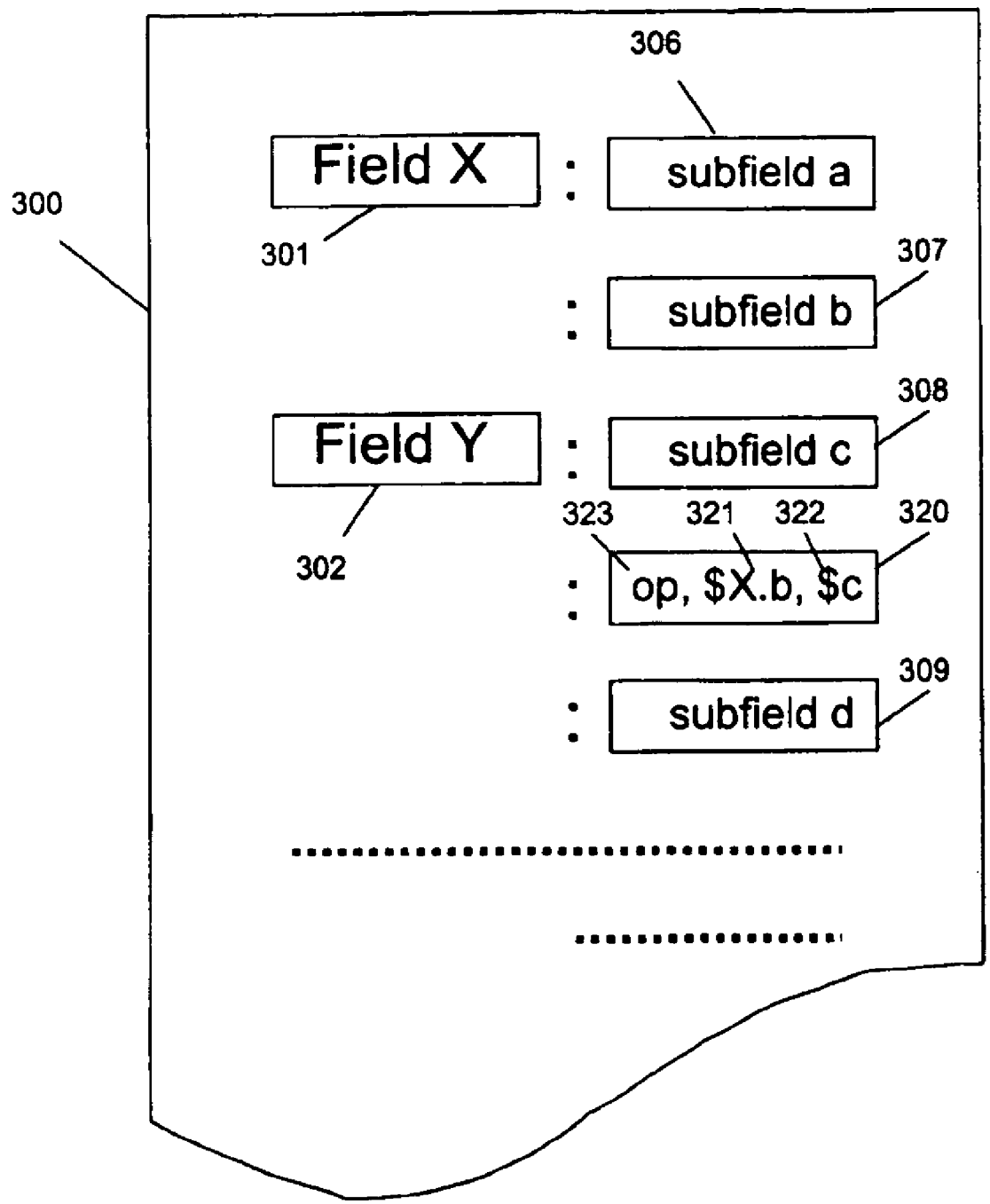
FIG. 2 is a diagram showing an example of an enhanced protocol specification corresponding to the data packet structure of FIG. 1.

As shown in FIG. 2, an enhanced protocol specification 300 includes definitions of the field structure, showing the fields Field X 301, and Field Y 302 in the left hand column and the structure of these fields in the right hand column. In this case, for the example of the data packet shown in FIG. 1, Field X 301 is defined by subfield a 306 and subfield b 307, whereas Field Y 302 is defined by subfield c 308 and subfield d 309. These are defined in the protocol specification. In the enhanced protocol specification 300 an operation 320 is also defined. In this case, the operation 320 is shown between subfield c 308 and subfield d 309 and includes a particular operational command 323, which needs to be carried out on metavariables $X.b 321 and $c 322. In this case, the metavariable $X.b 321 refers to subfield b 307 within field X 301 and metavariable $c refers to subfield c 308. Since the operation 320 is embedded between subfields c and d, it can refer directly to subfield c, but can only refer to subfield b as part of the hierarchy of field X. Thus, as soon as field X 301 and subfield c 308 have been decoded, the operation 320 can be carried out. Although, of course, the operation 320 could be carried out later, there is no need to do so since it only requires field X 301 and subfield c 308.

Figure 3:
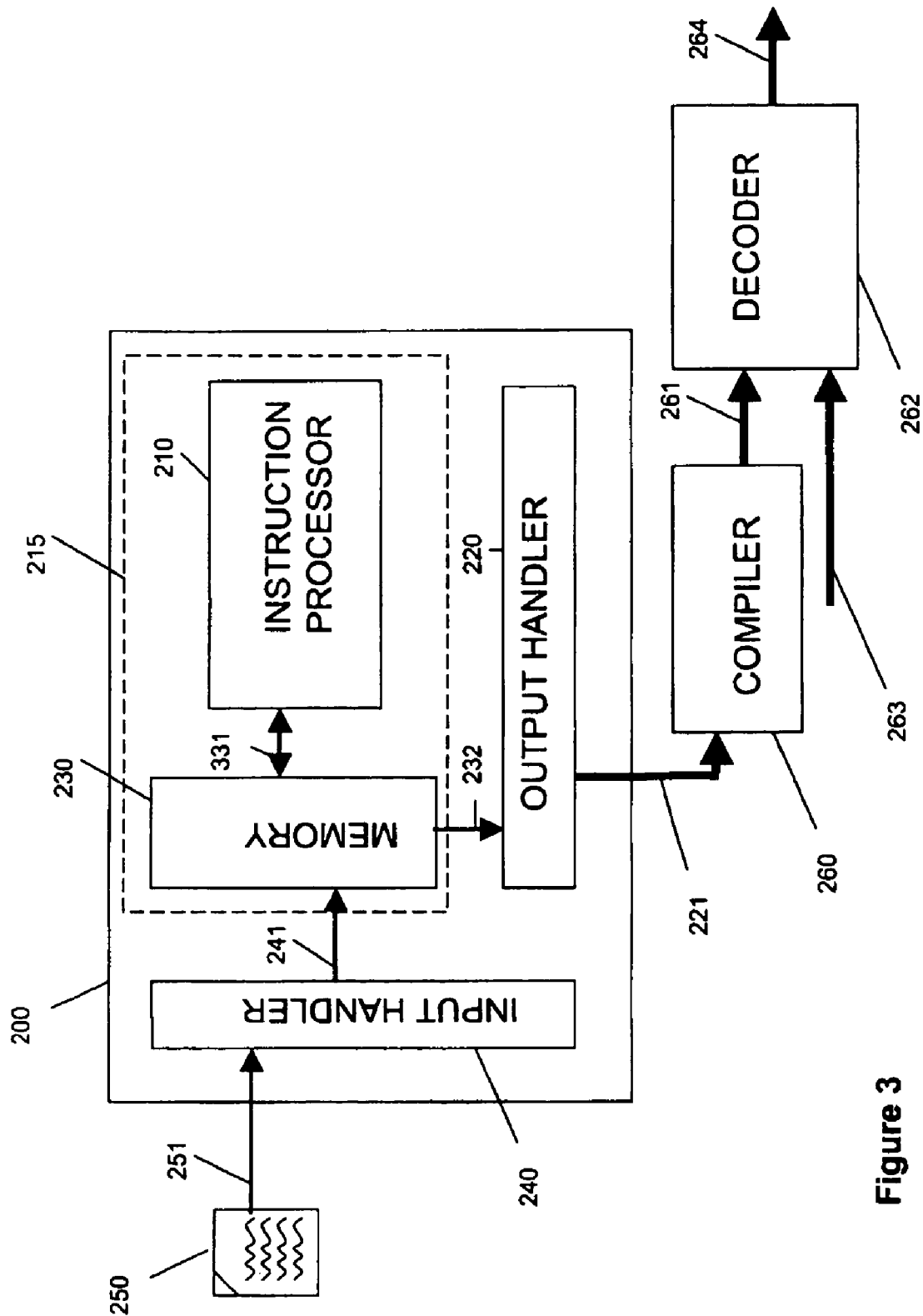
FIG. 3 is a schematic diagram of an apparatus according to one embodiment of the present invention.

FIG. 3 shows one embodiment of an apparatus for generating decoding instructions to be used for the decoding of data packets from a telecommunications network. An enhanced protocol specification 250 is provided, for example as a text file, at an input 251 to an instruction generator 200. The instruction generator includes an input handler 240, an instruction engine 215 and an output handler 220. The instruction engine 215 is formed by a memory 230 and an instruction processor 210. The enhanced protocol specification 250 is passed from the input 251 to the input handler 240, where it is appropriately handled, before being passed on a link 241 to the memory 230. The memory 230 is accessed by the instruction processor 210 to process the enhanced protocol specification and store decoder instructions back in the memory 210. These decoder instructions are then passed, via the output handler 220, where they may be appropriately handled, to a decoder 262. If necessary, the decoder instructions are passed via output 221 to a compiler 260, which translates the decoder instructions to a machine readable form for the decoder and then passes them from its output 261 to the decoder 262. Of course, if the instructions are generated in a form readable by the decoder, then the compiler is not necessary.

The instruction processor 210 is used to analyse the enhanced protocol specification and determine which fields (or subfields) are required for an operation to be able to be executed. If a particular field is not required for an operation that is included in the enhanced protocol specification, then there is no need for that field to be decoded. Thus, the instruction processor looks at all the operations that are included within the enhanced protocol specification 250 and determines which fields and subfields are directly required for those operations and which fields and subfields are required in order to decode the directly required fields and subfields. The instruction processor then generates appropriate decoding instructions for the decoder so that the decoder only decodes those fields and subfields that are necessary to support the operations within the enhanced protocol specification. It will be appreciated that, depending on the protocol specification, if a particular subfield is required, it may be possible to decode only that subfield within a field, or it may be necessary to decode the entire field containing that subfield or it may be possible to decode all of the field preceding that required subfield, but not the rest of the field following the required subfield.

Thus, if every field and subfield had a fixed offset, without those offsets being determined from earlier fields or subfields, then the decoding of any field or subfield that was not required by an operation could be skipped. Unfortunately most protocols are more complex than this, using variable length fields, optional fields, and choices (choice determinants). Such features may force the decoder to have to decode additional fields. As operations often need to refer to the values of previously decoded fields, the operations introduce implicit dependencies on other fields. By analysing such dependencies, the number of fields that have to be decoded to find expressions for bit offsets and lengths, for example, can be minimized, thereby minimizing the overheads of the processing. The decoding instructions generated by the instruction generator 200 thus include decoding commands and operations to be executed on data from decoded fields.

The output handler 220 may also be connected to display the decoding instructions and/or the enhanced protocol specification on a Graphical User Interface (GUI) (not shown) to enable a user to see the dependencies. From this a user could determine why a particular field was being decoded when, perhaps, it was not expected to be, by showing a chain of dependencies. The instruction generator 200 can be implemented on a Unix machine, but it will be obvious to someone skilled in the art that it could be implemented in any other suitable manner.

Generally, of course, the instruction generator 200 operates offline and provides the decoding instructions to the decoder 262, which, once programmed with the decoding instructions, receives online the data packets to be decoded at an input 263 and provides an analysis of the decoded packets at an output 264. The protocol decoder can thus be specifically controlled for the particular operations that are required to be carried out. The decoder then only decodes those fields necessary for those operations. If different operations are needed to be carried out in parallel, then either a single decoder can be provided to carry a combined set of operations, or more than one decoder could be provided to carry out different sets of operations and decode those particular fields that are needed for those operations. Of course, once a particular application has been completed and is no longer needed, then the decoder can be reprogrammed with a fresh set of decoding instructions to carry out different operations. It will be appreciated that such a decoder is normally implemented as a module within specialised monitoring equipment, although it could be provided as a stand-alone piece of equipment.

It will be appreciated that although only one particular embodiment of the invention have been described in detail, various modifications and improvements can be made by a person skilled in the art without departing from the scope of the present invention.

What is claimed is:

1. Apparatus for generating decoding instructions for a decoder for decoding data packets from a telecommunications network, each of the data packets having a plurality of fields formatted in a predetermined protocol defined by a protocol specification, the apparatus comprising an input, an instruction generator and an output, the instruction generator receiving an enhanced protocol specification having the protocol specification and application operations attached thereto, wherein the instruction generator analyzes the enhanced protocol specification to determine which fields in a data packet formatted in the corresponding protocol are required in order to enable the application operations to be executed and generates instructions for controlling the decoder to decode the required fields and to execute the application operations.

2. Apparatus according to claim 1, wherein the required fields include a first type of field that are specified by the application operations and a second type of field that are needed in order to provide information about the first type of field and the instruction generator generates instructions for controlling the decoder to decode the first type and the second type of fields.

3. Apparatus according to claim 1, wherein the instruction generator generates instructions for controlling the decoder to decode only the required fields.

4. Apparatus according to claim 1, wherein the instruction generator interleaves the instructions for controlling the decoder to decode required fields and the instructions for controlling the decoder to execute application operations.

5. A decoding system for decoding data packets from a telecommunications network, each of the data packets having a plurality of fields formatted in a predetermined protocol defined by a protocol specification, the decoding system comprising a decoder and an apparatus according to any preceding claim, the decoder comprising a first input for receiving the decoding instructions, directly or indirectly, from the apparatus, a second input for receiving data packets from the telecommunications network, a decoding module and an output, the decoding module decoding the data packets from the second input according to the decoding instructions received at the first input and providing data from the decoded data packets at the output.

6. A decoding system according to claim 5 further comprising a compiler having an input coupled to the output of the apparatus and an output coupled to the input of the decoder for compiling the decoding instructions from the apparatus into a format suitable for the decoder.

7. A method of generating decoding instructions for a decoder for decoding data packets from a telecommunications network, each of the data packets having a plurality of fields formatted in a predetermined protocol defined by a protocol specification, the method comprising:
- receiving an enhanced protocol specification having the protocol specification and application operations attached thereto;
- analyzing the enhanced protocol specification to determine which fields in a data packet formatted in the corresponding protocol are required in order to enable the application operations to be executed; and
- generating instructions for controlling the decoder to decode the required fields and to execute the application operations.

8. A method according to claim 7, wherein the required fields include a first type of field that are specified by the application operations and a second type of field that are needed in order to provide information about the first type of field and the instruction generator generates instructions for controlling the decoder to decode the first type and the second type of fields.

9. A method according to claim 7, wherein generating instructions comprises generating instructions for controlling the decoder to decode only the required fields.

10. A method according to claim 7, wherein generating instructions comprises interleaving the instructions for controlling the decoder to decode required fields and the instructions for controlling the decoder to execute application operations.

* * * * *